E. H. BELL.
TIE PLATE.
APPLICATION FILED FEB. 19, 1909.
948,127.
Patented Feb. 1, 1910.
4 SHEETS—SHEET 1.
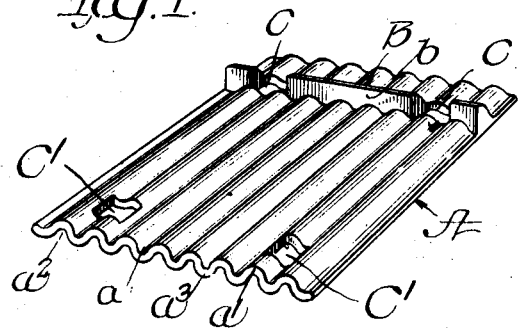
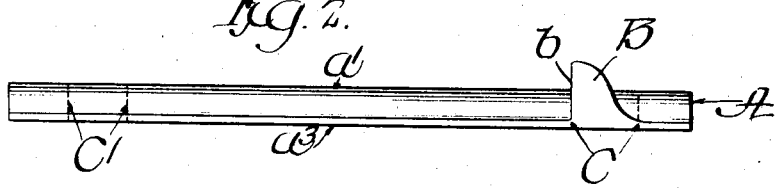
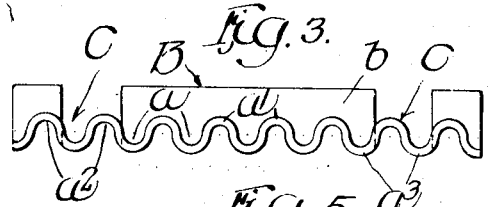
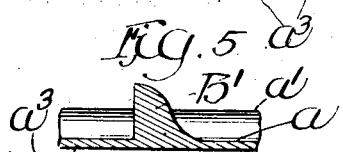
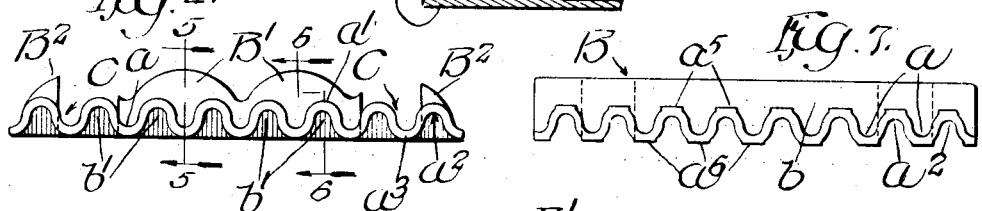
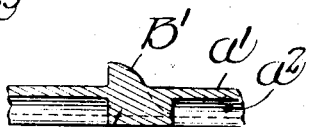
Witnesses:
Inventor:
Edwin H. Bell
by Poole, Brown Attys

E. H. BELL.
TIE PLATE.
APPLICATION FILED FEB. 19, 1909.

948,127.

Patented Feb. 1, 1910.

4 SHEETS—SHEET 2.

Witnesses:
F. H. Alfreds
G. R. Wilkins

Inventor:
Edwin H. Bell
by Poole, Brown
Attys

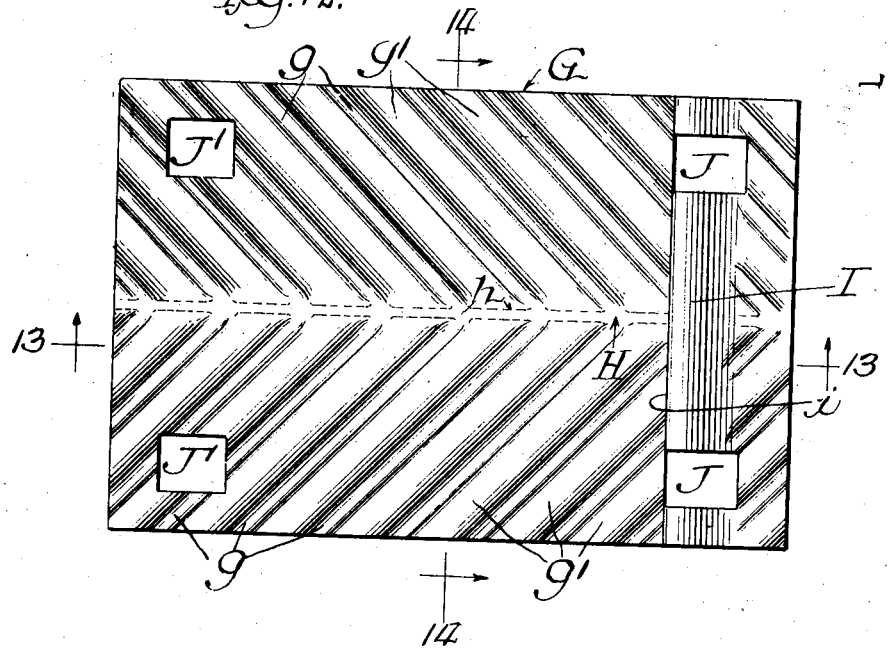
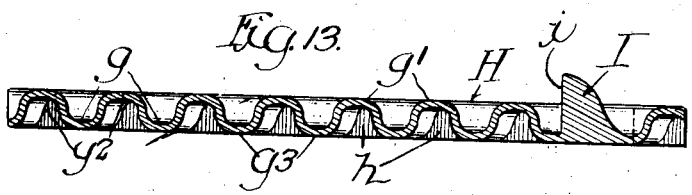
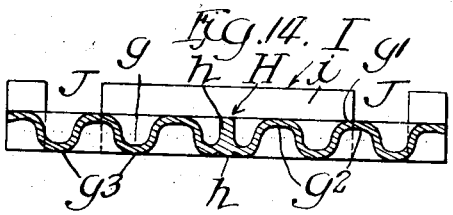

E. H. BELL.
TIE PLATE.
APPLICATION FILED FEB. 19, 1909.
948,127.
Patented Feb. 1, 1910.
4 SHEETS—SHEET 4.
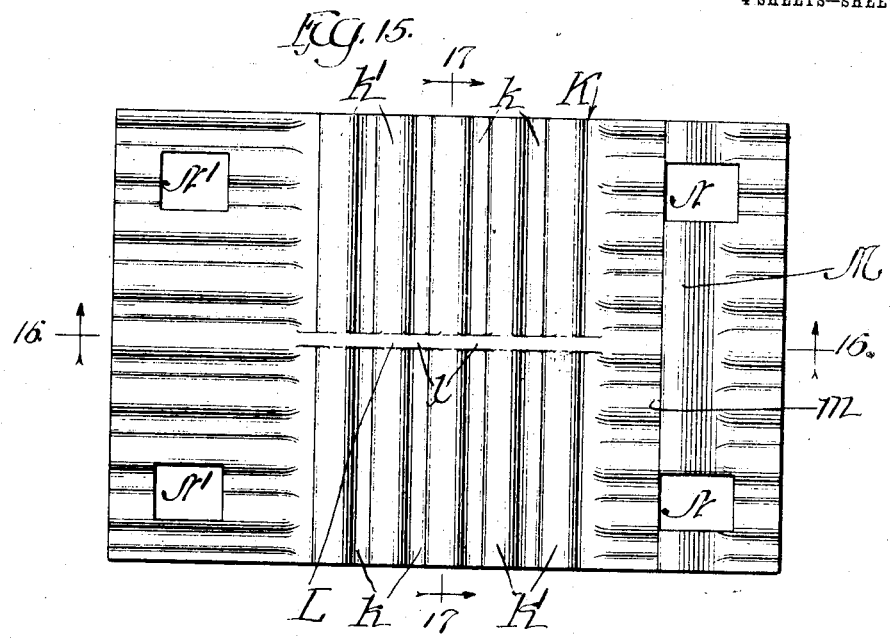
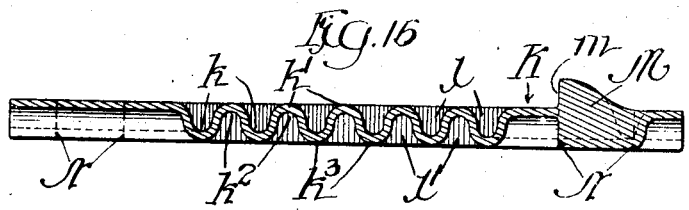
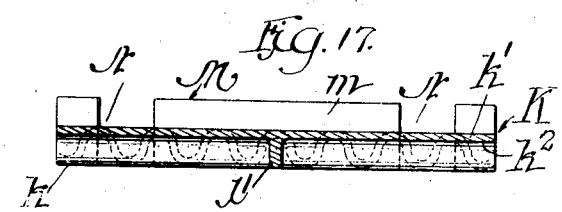
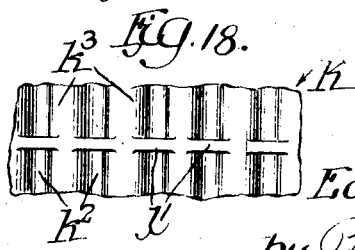
Witnesses:
Inventor
Edwin H. Bell
by Poole & Brown Attys

UNITED STATES PATENT OFFICE.

EDWIN H. BELL, OF CHICAGO, ILLINOIS.

TIE-PLATE.

948,127.  Specification of Letters Patent.  Patented Feb. 1, 1910.

Application filed February 19, 1909. Serial No. 478,773.

*To all whom it may concern:*

Be it known that I, EDWIN H. BELL, a citizen of the United States, and a resident of Chicago, in the county of Cook and State of Illinois, have invented certain new and useful Improvements in Tie-Plates; and I do hereby declare that the following is a full, clear, and exact description thereof, reference being had to the accompanying drawings, and to the letters of reference marked thereon, which form a part of this specification.

This invention relates to railway tie-plates of that class having upon the upper surface of the plate at one side of the rail-seat a rib or flange forming a rail-abutting shoulder tending to prevent lateral shifting of the rail upon the tie-plate and relatively to the tie.

In a tie-plate embodying my invention the body of the plate is substantially uniform in thickness and is of corrugated form, having grooves and intervening ribs on both sides thereof of substantially uniform size or width, and the flange or rib which forms the rail-abutting shoulder extends transversely of the grooves or corrugations of the plate.

Figure 8:
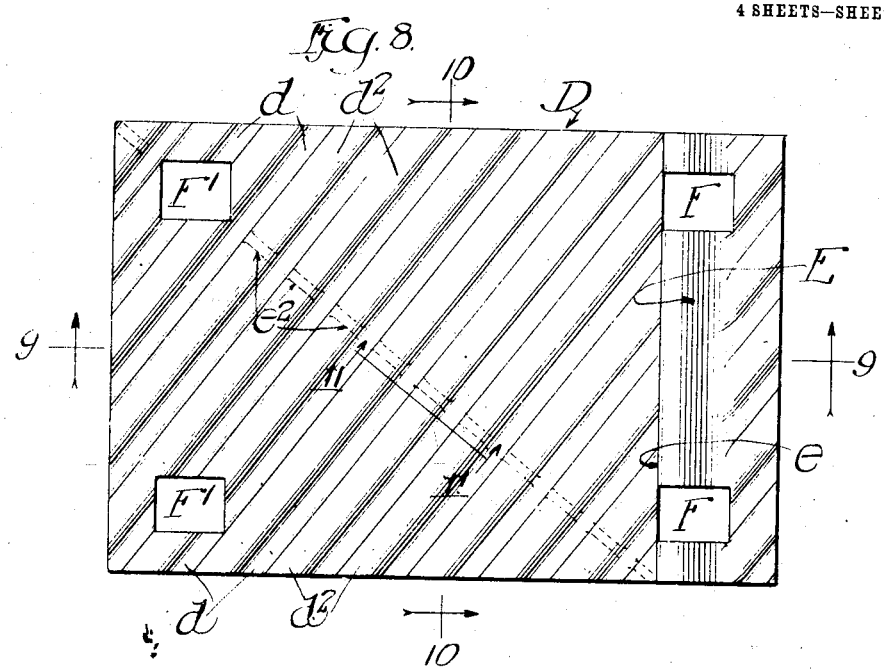
Figure 9:
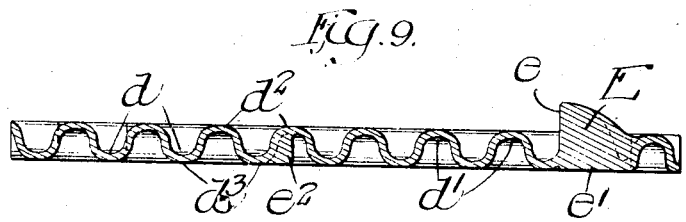
Figure 10:
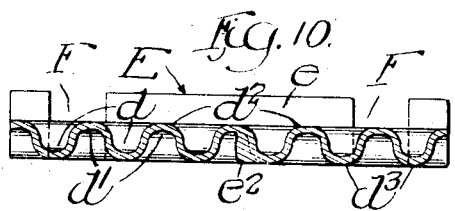
Figure 11:

The invention may be more readily understood by reference to the accompanying drawings, in which, Figure 1 is a perspective view of a tie-plate embodying my invention. Fig. 2 is a view in side elevation thereof. Fig. 3 is an end view thereof. Fig. 4 is an end view of a plate in which the rail abutting flange thereon consists of a series of rounded projections. Fig. 5 is a detail sectional view taken on line 5—5 of Fig. 4. Fig. 6 is a detail sectional view taken on line 6—6 of Fig. 4. Fig. 7 is an end view showing a plate in which the corrugated body thereof is of slightly modified form. Fig. 8 is a plan view of a plate having obliquely arranged corrugations. Fig. 9 is a sectional view taken on line 9—9 of Fig. 8. Fig. 10 is a sectional view taken on line 10—10 of Fig. 8. Fig. 11 is a detail section taken on line 11—11 of Fig. 8. Fig. 12 is a plan view of another form of plate having oblique corrugations. Fig. 13 is a section taken on line 13—13 of Fig. 12. Fig. 14 is a section taken on line 14—14 of Fig. 12. Fig. 15 is a plan view of a plate bearing with longitudinal and transverse corrugations. Fig. 16 is a sectional view taken on line 16—16 of Fig. 15. Fig. 17 is a sectional view taken on line 17—17 of Fig. 15. Fig. 18 is a detail view of the central part of the plate shown in Fig. 15, as seen from beneath.

As shown in Figs. 1 to 7 of the drawings, the tie-plate, indicated by A, is provided on its upper surface with a plurality of grooves $a$ and intervening ribs $a^1$, and on its under surface with a plurality of grooves $a^2$ and intervening projections $a^3$; said ribs and projections being arranged to give corrugated form to the plate, which is of substantially uniform thickness throughout. Said grooves and ribs on the upper and lower surfaces of the plate extend throughout the entire length thereof, and in a direction lengthwise of the plate or parallel with its side margins and transversely of the rail, when the latter is applied to or rests upon the plate. Near one end of the plate the same is provided with a rib or flange B which rises from the top surface of the plate, and the inner face $b$ of which is vertical and forms a rail-abutting shoulder. The grooves $a$, $a^2$ in the top and bottom surfaces of the plate are made so deep that the bottoms of the grooves extend past each other, with the result that the parts of the plate between the upper and lower grooves are substantially vertical or upright, and constitute in effect members which are adapted to give stiffness to the plate as a whole and great capacity to resist tendency to bend or buckle under the downward pressure of the rail thereon under heavy loads. The tie-plate illustrated in said Figs. 1 to 7 is provided with four spike holes, two of which C, C extend through the rib or flange B, and two of which $C^1$, $C^1$ are located near the opposite end of the plate. As shown in Figs. 1, 2 and 3, the rib B has its upper edge parallel with the body of the plate or is of uniform height throughout its length, but, as shown in Figs. 4, 5 and 6, the tie-plate, instead of being provided with a continuous rib, has a plurality of rounded projections $B^1$, $B^2$, two of which $B^1$, $B^1$ are higher than the other two $B^2$, $B^2$. In the instance illustrated in said Figs. 4, 5 and 6, the projections $B^2$, $B^2$ of less height, are located adjacent to the side margins of the plate and the spike holes C, C extend through the same. Said Figs. 5, 6 and 7 also illustrate another feature of my invention, to wit; the rib forming the rail abutting shoulder is extended downwardly to the level of the bottom of the plate, in the form of short webs or fillings $b^1$, $b^1$, which severally extend across the grooves $a^2$, $a^2$ in the bottom of the plate. A rib thus made, whether straight at its top edge, as in Figs. 1, 2 and 3, or notched to form rounded projections at its top edge, as in Figs. 4, 5 and 6, serves to greatly stiffen or strengthen the plate.

In the modified form of construction shown in Fig. 7, the body of the plate is corrugated in the same manner as before described and is of substantially uniform thickness throughout, but between the grooves at the top and bottom surfaces of the plate, flat surfaces $a^5$, $a^6$ are formed. Said flat surfaces constitute bearing surfaces on the bottom of the plate which rest against the tie and bearing surfaces on the top of the plate constituting the seat on which the rail rests or is supported.

The tie-plate made as described is intended to be produced by the rolling of a long or continuous blank corresponding in cross-sectional form with the body of the tie and provided with transverse ribs or flanges at intervals, located a distance corresponding with the length of the finished tie. Separate tie-plates are produced by severing the rolled blank thus formed, between the said ribs or flanges.

A tie plate, the body of which is of uniform thickness and corrugated and has an integral rib forming a rail-abutting shoulder, has the advantage of possessing the necessary stiffness or rigidity with a plate which is very light in weight, such superior stiffness or rigidity being due to the fact that the corrugations are made so deep, or the distance between the top and bottom surfaces of the plate so great in proportion to its thickness, that the substantially upright portions of the plate which intervene between the top and bottom grooves constitute, in effect, vertical webs or stiffening members affording a high degree of resistance to flexure of the plate under the downward pressure of the rail thereon, while the transverse rib or flange, being made integral with the corrugated body of the plate and extending across the grooves or corrugations serves to give lateral rigidity thereto and to prevent flattening of the corrugated body of the plate, or the spreading apart of its corrugations under the downward pressure thereon. In the case of the construction shown in Fig. 4, in which the rail abutting rib is continued downwardly to the level of the bottom surface of the plate, a large degree of stiffness or rigidity is given to the said plate, and when the rib has rounded projections at its top edge, the rib itself is made sufficiently strong or rigid, notwithstanding the presence of the depressions or notches between the rounded projections.

A plate provided with a rail-abutting shoulder and the body of which is of corrugated form, as shown, has the further advantage that the grooves in the lower surface thereof afford air channels preventing the retention of water or moisture between the tie-plate and the tie, while the grooves in the upper surface of the plate form spaces to receive sand or grit which would, in the absence of said grooves, remain between the rail and the top surface of the tie-plate and tend to produce rapid wear in the contacting surfaces of the tie-plate and rail.

In Figs. 8, 9, 10 and 11 is shown tie-plate D, the body of which is provided with grooves $d$, $d^1$, and intervening ridges $d^2$, $d^2$ giving corrugated form to the plate, in the same manner as hereinbefore described, but in which the grooves or corrugations are obliquely arranged with respect to the side margins of the plate. In this instance the plate is provided with a rib E, which extends above the top of the plate and forms a rail-abutting shoulder $e$, said rib being extended downwardly to the level of the bottom of the plate by means of filling pieces $e^1$, $e^1$ (Figs. 9 and 10) in the same manner as described in connection with Figs. 4, 5 and 6. The tie-plate shown in said Figs. 8 to 11 is provided with means for preventing the flattening of the plate, by the spreading apart of the portions thereof between the grooves, consisting of short downwardly extending webs or flanges on the under side of the plate, extending across the grooves $d^1$, $d^1$, as indicated by $e^2$ in Fig. 11, and by the dotted lines in Fig. 8. The plate shown in Fig. 11 is provided with two spike holes F, F extending through the rib E and with two spike holes $F^1$, $F^1$ near the opposite margin of the plate.

In Figs. 12, 13 and 14 is shown a plate G, embracing the same general features hereinbefore described. In this instance, the plate G is provided with two sets of corrugations formed by grooves $g$ and intervening ribs $g^1$ at the top of the plate and grooves $g^2$ and intervening ribs $g^3$ at the bottom of the plate. The two sets of grooves or corrugations are oppositely inclined and meet along the central, longitudinal line of the plate. At such central, longitudinal line is formed what is in effect a continuous rib H, consisting of a series of short flanges or web-portions $h$, extending across the grooves $g$ in the top of the plate and a series of like web members $g^1$ extending across the grooves $g^2$ in the bottom of the plate, the said web-members being arranged in alinement with each other so as to form the continuous rib H. In this instance the plate is provided with a rib I provided with a rail-abutting shoulder $i$ and the plate is provided with spike holes J, J extending through the rib I and, near its opposite margin, with spike holes $J^1$, $J^1$.

As shown in Figs. 15, 16, 17 and 18, a tie-plate K is shown having corrugations extending both transversely and longitudinally thereof. In this instance the tie-plate is provided centrally of its length with a series of transversely extending corrugations formed by means of grooves $k$ and intervening ribs $k^1$ at its top surface and a series of grooves $k^2$ and intervening ribs $k^3$ at its bottom surface; the corrugations thus formed extending across the plate from side to side thereof. The end portions of the plate in this instance are provided with longitudinally extending corrugations formed by means of grooves in its top and bottom surfaces, in the same manner as hereinbefore described. In order to stiffen the plate and to prevent the elongation of the same by the flattening of the central transverse corrugations, the plate is provided with a longitudinal rib L extending across the said corrugations and formed by means of short flanges $l$, $l$ extending across the several grooves $k$, $k$ in the top of the plate and like flanges $l^1$, $l^1$ extending across the grooves $k^2$, $k^2$ in the bottom of the plate. In this instance the plate is provided with a rib M forming a rail-abutting shoulder $m$, said rib being extended downwardly so that its bottom surface is at the level of the bottom surface of the plate, as hereinbefore described. The plate in this instance is provided with spike holes N, N extending through the rib M and with spike holes $N^1$, $N^1$ near the opposite end margin of the plate.

I claim as my invention:—

1. A tie-plate provided in its top and bottom surfaces with grooves giving corrugated form to the plate, the body of said plate being of substantially uniform thickness throughout and the intervening ridges between said grooves constituting a rail supporting surface and a bottom bearing surface for contact with the tie, said plate having an integral rib extending across the grooves in the top and bottom surfaces of the plate and rising above the rail bearing surface of the plate to form a rail abutting shoulder.

2. A tie-plate provided in its top and bottom surfaces with parallel grooves giving corrugated form to the plate, and having a rib which extends transversely to the corrugations, said rib extending above the rail supporting surface of the plate to form a rail-abutting shoulder, and having its lower surface in the plane of the bottom surface of the plate.

In testimony, that I claim the foregoing as my invention I affix my signature in the presence of two witnesses, this 17th day of February A. D. 1909.

EDWIN H. BELL.

Witnesses:
  G. J. BRYCE,
  GEORGE R. WILKINS.